United States Patent Office 3,679,521
Patented July 25, 1972

3,679,521
DRIVEN MANDREL ROTATABLE ABOUT ITS LONGITUDINAL AXIS

Peder Ulrik Poulsen, Graested, Denmark
(Lonholt Ladegaard, 3480 Fredensborg, Denmark)
Filed Feb. 27, 1970, Ser. No. 15,097
Claims priority, application Denmark, Feb. 28, 1969, 1,133/69
The portion of the term of the patent subsequent to Sept. 2, 1986, has been disclaimed
Int. Cl. B65h 81/08
U.S. Cl. 156—429
4 Claims

ABSTRACT OF THE DISCLOSURE

A driven mandrel for production of tubing in continuous lengths comprises a tubular core section extending beyond bearing supports for the care section and on which is mounted a mandrel wall on the outer surface of which the tubing is formed. The outer wall is constituted by an endless strip wound continuously and helically towards the free end of the core section with adjacent convolutions in edge to edge relationship. The strip is supported on rows of rolls rotatably supported and secured against longitudinal movement in radial frames extending from the core section.

---

Figure 1:
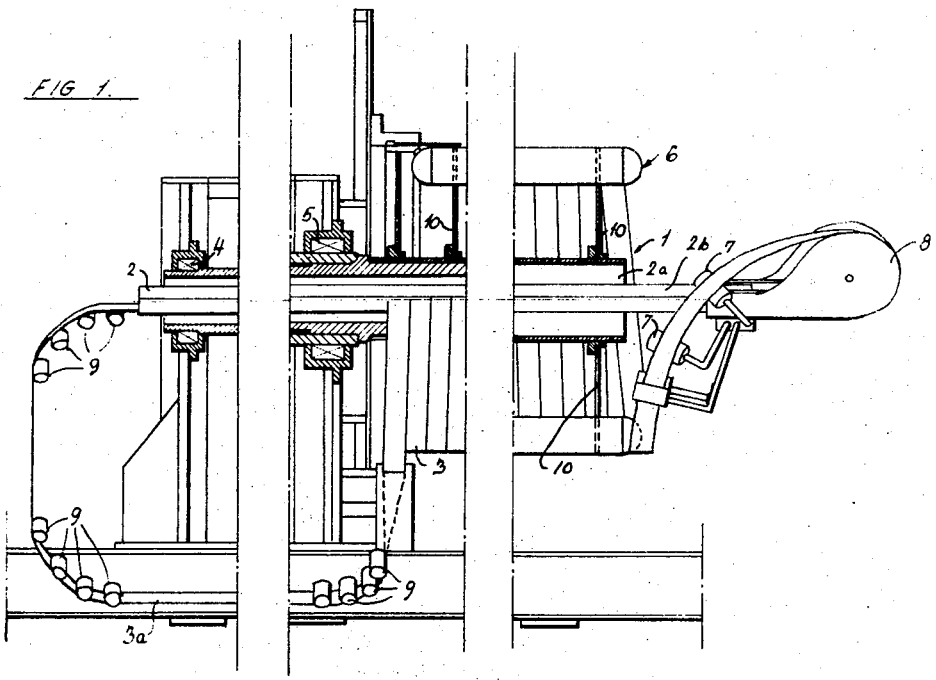

This invention relates to a driven mandrel for continuous production of tubing of indefinite length, preferably glass fibre reinforced plastic tubing and is of the type which is rotatable about its longitudinal axis and which comprises a tubular mandrel core having a core section projecting at one end beyond the mandrel bearings, an outer wall surrounding and spaced from the projecting core section, on the outer surface of which the tubing is formed and which is constituted by an endless strip that is being wound continuously and helically in the direction towards the free end of the mandrel core with a pitch corresponding to the width of the strip so that the convolutions will be disposed in edge to edge relationship. From the free core end the strip is carried through the mandrel core and back to the point where the winding commenced, and to the said mandrel core section are attached support means for the outer mandrel wall, on which the strip is being wound in the manner described.

To the outer surface of the outer wall of such a mandrel a material, preferably a thermosetting, glass fibre reinforced plastic material of suitable consistency, is applied in conventional manner. By the rotation of the mandrel, if desired in conjunction with conventional distributing and shaping means, the plastic material on the mandrel is caused to form a tubular sheathing which encloses the mandrel wall and is advanced continuously towards the free end of the mandrel core and beyond that end by the continuous movement of the convolutions forming the outer mandrel wall caused by the rotation of the mandrel. After setting the produced tubing is cut to desired lengths.

In the known mandrels of this type the support means of the endless strip are usually formed as rails attached to the mandrel core and extending in the entire length and being spaced from each other a peripheral distance determined by the rigidity of the winding strip.

It is the object of the present invention to provide means for supporting the strip convolutions forming the outer mandrel wall in a manner permitting frictionless movement in the longitudinal direction of the mandrel and at the same time providing maximum resistance to undesirable movement of the convolutions in peripheral direction relatively to the support means. This has been achieved according to the invention by providing support means for the outer mandrel wall secured to the mandrel core and on which the strip is being wound in the manner described, said support means being rows of rolls journaled against displacement in the direction of the longitudinal axis of the mandrel in frames extending radially from the mandrel core at equal radial distances from its longitudinal axis and positioned parallel to the said axis and spaced equally apart around the periphery of the mandrel core, said rolls being spaced equally along the said longitudinal axis and freely rotatable about an axis perpendicular to the longitudinal axis of the mandrel.

Such roll members can be rotated practically without friction when the strip convolutions forming the outer mandrel wall and engaging the periphery of the roll members to be supported thereby during the displacement of the windings towards the free end of the mandrel tend to rotate the roll members in axial direction about their axis, whereas displacement of the mandrel windings in any other direction relatively to the roll members presupposes that the windings slip on the roll members, and this undesirable slip is prevented by the frictional resistance. The advantages of using such roll members in lieu of ball belts are that the radial extent of the roll members is substantially less than the radial distance required between the two belt sections of a ball belt, so that the roll members can be mounted on winding mandrels for the production of plastics tubing of considerable smaller diameter than the minimum diameter of the plastics tubing that can be made on a winding mandrel where the support means for the outer mandrel wall has been made in any previously known manner.

When in accordance with one embodiment of the invention each roll member is formed as a castor with two pointed journals mounted in their respective pivot bearings in a roll frame extending radially from and in the total length of the mandrel core, the mounting of these members with low friction will enable them to absorb both radial and axial forces provided these forces do not exceed a certain limit. This embodiment is therefore praticularly useful in winding mandrels with a relatively small diameter.

For winding mandrels with large diameter and where the support means of the outer mandrel wall are subject to heavy loads each roll member may in accordance with another embodiment of the invention be in the form of a roll disposed on a through-going shaft mounted in a roll frame extending radially from and in the total length of the mandrel core.

In a further embodiment of the invention each roll member is formed by a roll or ball bearing mounted on a shaft secured in a frame extending radially from and in the total length of the mandrel core the displacement of the strip convolutions in the longitudinal direction of the mandrel being then further facilitated and the power required for rotating the mandrel thus being reduced to a minimum.

Figure 2:
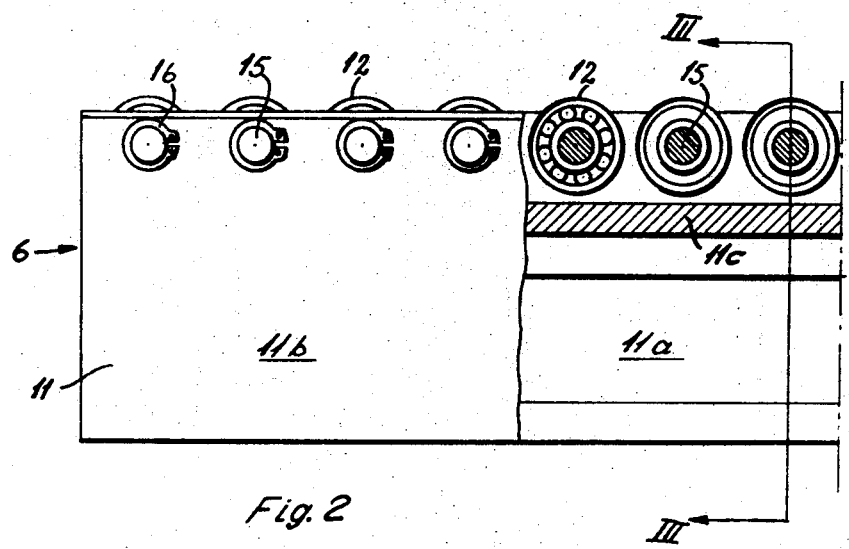
Figures 3, 4, 5:
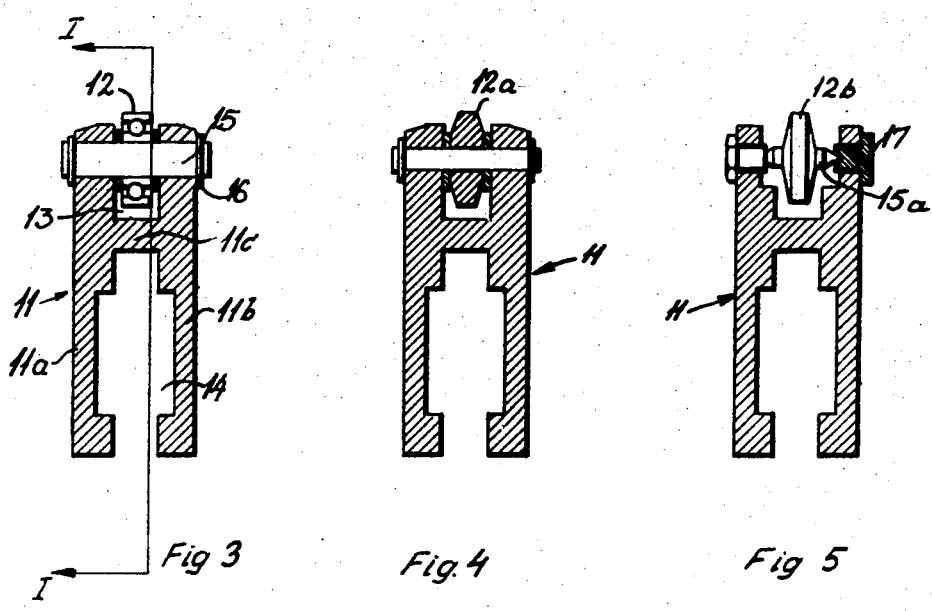

The invention will be explained herein greater detail and with reference to the drawing, in which FIG. 1 shows an embodiment of the driven mandrel according to the invention viewed in side elevation and partly in section, FIG. 2 shows an embodiment of the roll members according to the invention viewed in side elevation and partly in section along the line II—II in FIG. 3, FIG. 3 presents a sectional view along the line III—III in FIG. 2, FIG. 4 is a sectional view corresponding to FIG. 3, but through another embodiment of the roll member according to the invention, and FIG. 5 is a similar section through a third embodiment of the roll members according to the invention.

FIG. 1 shows a mandrel 1 for continuous production of plastic tubing of indefinite length. The mandrel comprises a tubular mandrel core 2 and a circular-cylindrical outer wall 3 concentrically surrounding and spaced from the core. The mandrel core 2 is rotatable in the two bearings 4 and 5, of which bearing 4 is positioned at one end of the mandrel core, while the other bearing 5 is positioned so that the mandrel core has a section 2a extending beyond the bearings. The mandrel is adapted for rotation about its longituudinal axis by means of a driving device not shown here.

The outer wall 3 of the mandrel is formed by an endless mirror-finish steel strip 3a which on the rotation of the mandrel core, by means of guide members (not shown here) opposite the root of the freely projecting core section is being wound helically in the direction from left to right in FIG. 1 on support means 6 attached to the mandrel core by means of radially extending mountings 10. The strip convolutions on the support means are being wound by means of the guide members with a pitch corresponding to the strip width so that the convolutions will be disposed in edge to edge relationship and form an unbroken, smooth outer mandrel wall.

By the rotation of the mandrel the strip convolutions are moved towards the right-hand side in FIG. 1 until they reach the free end of the mandrel core, where the strip is received by guide rolls 7 and led to a reversing roll 8, which is rotatably mounted on an extension member 2b projecting axially from the free end of the core tube. The axis of rotation of the reversing reel 8 is disposed adjacent to the longitudinal axis of the mandrel. By means of the reversing reel 8 the strip is carried back in known manner through the hollow core of the mandrel, from the rear end of which the strip is led, by means of guide rolls 9, in a loop to the point at the root of the freely projecting section of the mandrel core where the winding of the strip on the support means is commenced.

FIG. 2 presents a schematic view of the support means 6 in the form of a frame 11 for a plurality of ball bearings 12 serving as support means for the outer mandrel wall of the winding mandrel. The frame 11 has the form of a girder extending in the longitudinal direction of the mandrel and comprising two parallel prongs 11a and 11b in FIG. 3, and a bridge 11c connecting the said prongs and positioned to divide the space between the girder prongs into a longitudinally extending groove 13 that is open at the radially outer side of the prongs and a groove 14 on the opposite side of the bridge.

The ball bearings 12 are aligned in the groove 13 and freely rotatable on their respective shafts 15, which are carried through two aligned apertures in the prongs 11a and 11b. The ball bearing shafts projects slightly from the outer faces of the prongs and are secured against displacement by locking rings 16. The frame 11 is slid on to mountings 10 on the core of the mandrel by means of the groove 14.

A suitable number of such frames with ball bearings of the type described here are mounted on the mandrel core regularly spaced in peripheral direction and spaced by the same distance from the longitudinal axis of the mandrel. The ball bearings 12 are mounted in the grooves 13 projecting slightly beyond the radially outer side of each prong and regularly spaced both in the longitudinal direction of the mandrel and peripherally to effectively support the windings of a steel strip wound around the frames 11 on the mandrel core in edge relationship to form the outer mandrel wall. The strip convolutions extend substantially perpendicular to the paper plane in FIG. 2.

FIG. 4 shows an embodiment corresponding to that of FIGS. 2 and 3, except that rolls 12a have been substituted for the ball bearings.

FIG. 5 illustrates an embodiment with rolls 12b which are not mounted on a separate throughgoing shaft, but are provided on either side with projecting pointed journals 15a mounted in their respective pivot bearings 17 in the prongs.

What I claim is:

1. In a driven mandrel rotatable about its longitudinal axis for continuous production of tubing in running lengths, and comprising a tubular mandrel core, bearing means supporting said core so that the latter has a core section extending beyond said bearing means, an outer mandrel wall spaced from and surrounding said core section and on the outer surface of which the tubing is formed, said outer wall being constituted by an endless strip which is being wound continuously and helically in the direction towards the free end of the mandrel core with a pitch corresponding to the strip width so that the convolutions are disposed in edge to edge relationship and which is returned from the free core end through the tubular core to the point where the winding starts, support means for the outer mandrel wall secured to the mandrel core, said support means including frames extending radially from the mandrel core at equal radial distance from its longitudinal axis and positioned parallel to said axis and spaced equally apart around the periphery of the mandrel core, and rows of rolls supported by said frames and secured against displacement in the direction of the longitudinal axis of the mandrel, said rolls being spaced equally along said longitudinal axis and being freely rotatable in said frames about an axis perpendicular to the longitudinal axis of the mandrel.

2. In a driven mandrel as defined in claim 1, each roll member including a castor with two pointed journals, one projecting from each side of the castor and mounted in respective pivot bearings in said frames.

3. In a driven mandrel as defined in claim 1, each roll member including a roll, and a support shaft mounted in said frame.

4. In a driven mandrel as defined in claim 1, each roll member including a ball bearing, and a support shaft mounted in said frame.

References Cited

UNITED STATES PATENTS

| | | | |
|---|---|---|---|
| Re. 25,457 | 10/1963 | Lewis et al. | 156—425 |
| 3,464,879 | 9/1969 | Poulsen | 156—425 |
| 3,551,254 | 12/1970 | Warner et al. | 156—426 |
| 2,845,109 | 7/1958 | Schneider | 156—429 |
| 3,004,585 | 10/1961 | Lewis et al. | 156—429 |
| 3,367,815 | 2/1968 | Ragetti et al. | 156—429 X |

BENJAMIN A. BORCHELT, Primary Examiner

H. J. TUDOR, Assistant Examiner